US00RE36729E

United States Patent [19]

Luch et al.

[11] E Patent Number: Re. 36,729

[45] Reissued Date of Patent: Jun. 13, 2000

[54] CONTAINER WITH CURLED TAMPER-EVIDENT BAND TO RETAIN CLOSURE

[75] Inventors: Daniel Luch, Morgan Hill; Rawson Chenault, Newark, both of Calif.

[73] Assignee: Portola Packaging, Inc., San Jose, Calif.

[21] Appl. No.: 08/718,052

[22] Filed: Sep. 17, 1996

Related U.S. Patent Documents

Reissue of:

[64] Patent No.: 5,163,575
Issued: Nov. 17, 1992
Appl. No.: 07/741,650
Filed: Aug. 7, 1991

U.S. Applications:

[63] Continuation of application No. 08/216,634, Mar. 23, 1994, abandoned.

[51] Int. Cl.[7] ..... B65D 17/40

[52] U.S. Cl. ..... 220/276; 215/256

[58] Field of Search ..... 220/270, 276, 220/692, 693, 616, 319; 215/274, 250, 256; 206/807; 229/5.6, 5.7, 5.8, 123.2

[56] References Cited

U.S. PATENT DOCUMENTS

| | | | |
|---|---|---|---|
| 1,961,559 | 6/1934 | Herrmann | 229/5.6 |
| 2,134,984 | 11/1938 | Page | 229/5.7 |
| 2,846,831 | 8/1958 | Dobbins | 29/453 X |
| 3,268,105 | 8/1966 | Geiger | 229/123.2 |
| 3,902,630 | 9/1975 | Knize | 220/319 |
| 4,016,807 | 4/1977 | Schellenberg | 229/123.2 |
| 4,024,976 | 5/1977 | Acton | 220/276 X |
| 4,171,062 | 10/1979 | Allen et al. | 220/270 |
| 4,190,175 | 2/1980 | Allen | 220/270 |
| 4,362,253 | 12/1982 | Wortley et al. | 220/276 |
| 4,475,274 | 10/1984 | Beckstrom et al. | 29/453 X |
| 4,645,087 | 2/1987 | Kusz | 220/319 |
| 4,708,255 | 11/1987 | Thompson | 215/329 |
| 4,709,824 | 12/1987 | Thompson | 215/252 |
| 4,711,364 | 12/1987 | Letica | 220/276 |
| 4,718,571 | 1/1988 | Bordner | 220/270 |
| 4,732,293 | 3/1988 | Landis | 220/276 |
| 4,748,735 | 6/1988 | Hayes | 29/453 |
| 4,793,506 | 12/1988 | Thompson | 215/344 |
| 4,811,857 | 3/1989 | Thompson | 215/329 |
| 4,823,967 | 4/1989 | Thompson | 215/222 |
| 4,856,667 | 8/1989 | Thompson | 215/318 |
| 4,872,304 | 10/1989 | Thompson | 53/487 |
| 4,878,595 | 11/1989 | Uhlig | 206/807 X |
| 4,909,434 | 3/1990 | Jones et al. | 229/125.15 |
| 4,934,554 | 6/1990 | Edwards | 220/266 |
| 4,966,292 | 10/1990 | Marino | 215/256 |
| 5,111,953 | 5/1992 | Faust et al. | 206/807 |
| 5,249,694 | 10/1993 | Nelson | 220/276 |
| 5,253,772 | 10/1993 | Earnest | 229/123.6 |

*Primary Examiner*—Allan N. Shoap
*Assistant Examiner*—Nathan Newhouse
*Attorney, Agent, or Firm*—Flehr Hohbach Test Albritton & Herbert

[57] ABSTRACT

A thin-walled, wide mouth molded plastic container is provided with a tamper evident band initially molded as a straight-walled cylinder spaced outwardly of the lip of the container and connected thereto by a frangible horizontal bridge. The upper edge of the cylindrical band extends above the level of the container lip. Subsequent to molding and preferably before capping, the band is curled inward by application of a curling tool. The container lid is axially applied, the outer edge of the lid displacing the curled band outward. The resilience of the band and bridge permits outward deflection and immediate restoration of the curl to its initial position. The curl prevents removal of the lid without fracture of the bridge and removal of the tamper-evident band.

20 Claims, 2 Drawing Sheets

CONTAINER WITH CURLED TAMPER-EVIDENT BAND TO RETAIN CLOSURE

Matter enclosed in heavy brackets [ ] appears in the original patent but forms no part of this reissue specification; matter printed in italics indicates the additions made by reissue.

*This is a continuation of application Ser. No. 08/216,634 filed Mar. 23, 1994, now abandoned.*

BACKGROUND OF THE INVENTION

1. Field of the Invention

This invention relates to a new and improved container with a tamper-evident band to retain a closure. More particularly, the invention relates to a thin-walled, wide mouth container having a band attached to its upper peripheral edge which is inwardly curled to retain a cover lid. To remove the lid, the band must be removed, and this makes the container tamper-evident.

2. Description of Related Art

Curling of plastic cylindrical bands is known in the art. For example, applying a concave tool to the edge of a cylindrical plastic member is shown in numerous patents to Thompson, U.S. Pat. Nos. 4,708,255; 4,709,824; 4,793,506; 4,872,304; 4,823,967; 4,811,857; and 4,856,667 being typical. These patents disclose a curled bead which is resilient and is compressed when a screw closure is applied to a container neck. Similar curling techniques are employed in the present invention, but the curled flange is employed for a totally different purpose, namely, the band curls over the edge of a lid and holds the lid in place until the band is removed.

SUMMARY OF THE INVENTION

The container of the present invention is initially molded with a straight-walled cylindrical band spaced outwardly of, but connected to, the outside of the container body through a frangible line of weakness. Subsequent to molding, a curling tool engages the edge of the band and the tool is formed with a concavity which causes the edge of the band to curl inwardly and downwardly. A lid is applied axially to the container. As the lid engages the curled band, it resiliently forces the band outwardly until the curled portion thereof snaps over the top of the lid. So long as the band is intact, the lid cannot be removed. However, the band may be broken from the container along the line of weakness and thereafter the lid may be removed. Fracture at the line of weakness gives evidence of tampering.

Alternatively, the curling of the tamper-evident band may be performed after the lid is in place.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE PREFERRED EMBODIMENT

Figure 1:
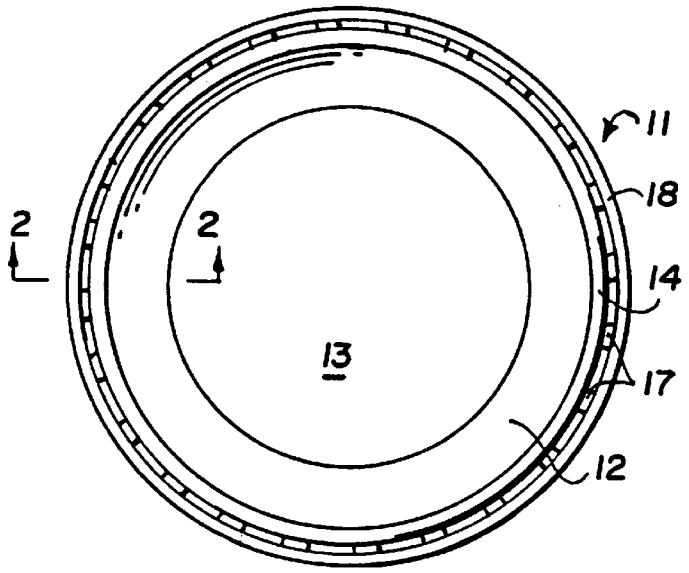
FIG. 1 is a top plan view of a container formed in accordance with the present invention before curling of the tamper-evident band.

Reference will now be made in detail to the preferred embodiments of the invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications and equivalents, which may be included within the spirit and scope of the invention as defined by the appended claims.

Container 11 is subject to wide modification. As here shown, it is depicted as a thin-walled, wide mouth container preferably made of high density polyethylene or polypropylene of the type used for various dairy products such as margarine, cottage cheese, and the like. It will be understood that the details of the structure of the container 11 are subject to wide modification. As illustrated herein, the container 11 has an upwardly-outwardly inclined conical wall 12 and a bottom 13. At the top edge of the wall 12 is an outwardly curled lip 14 which merges in a vertically downwardly extending portion 16. Extending outward from the lower edge of portion 16 are thin, substantially horizontal frangible bridges 17 which constitutes a line (or more precisely, a circle) of weakness. Bridges 17 are preferably interrupted—i.e., made of angularly spaced connections separated by gaps. Extending upward from the bridge 17 is a tamper-evident band 18 which is initially cylindrical as shown in FIG. 2.

Figure 2:
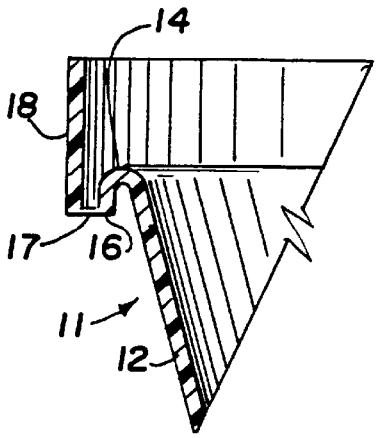
FIG. 2 is a sectional view taken substantially along the line 2—2 of FIG. 1.
Figure 3:
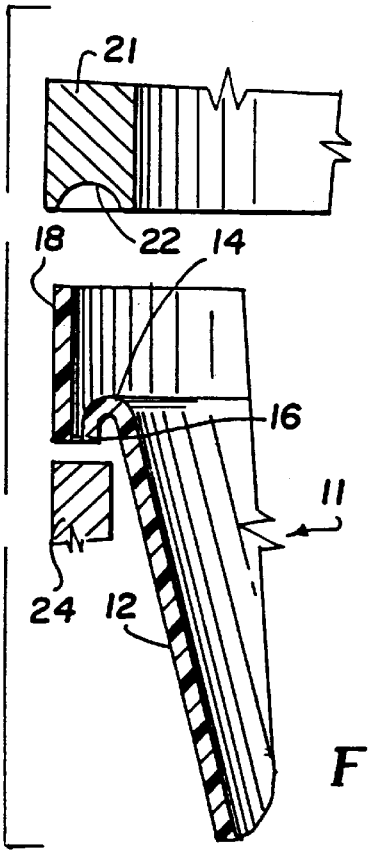
FIG. 3 is a schematic exploded sectional view showing the curling tools immediately before engaging the tamper-evident band.

The container shown in FIG. 2 is modified by the tooling shown in FIG. 3. Above the upper edge of band 18 is a ring-shaped tool 21 having a concavity 22 formed on its lower surface. Below the band 18 is a second reshaped tool 24 which supports the bottom edge of the band 18 and the bridge 17. Tool 21 is brought vertically downwardly and as the upper edge of band 18 engages the concavity 22 it is bent into an inward curl 26 shown in FIG. 4, the curl 26 having a terminus 27 spaced upward from lip 14.

Figure 5:
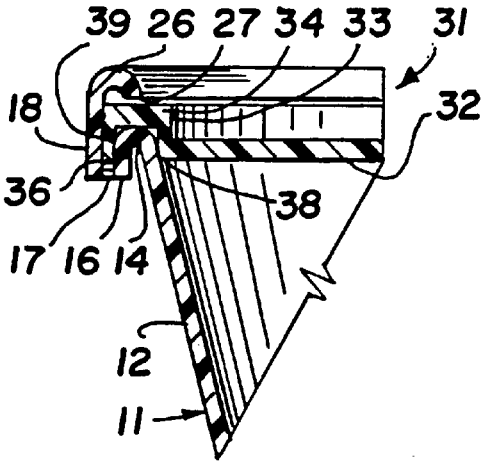
FIG. 5 is a sectional view showing application of the lid.

A lid 31 which may be used with the container 11 is shown in FIG. 5. Such a lid 31 may have a top disc 32 having a diameter less than that of the top of wall 12. The outer edge of disc 32 is formed with an upward extending edge 33 and extending outward from edge 33 is an annular ring 34 which extends over the lip 14. A downward directed skirt 36 is connected to the outer edge of ring 34.

Figure 4:
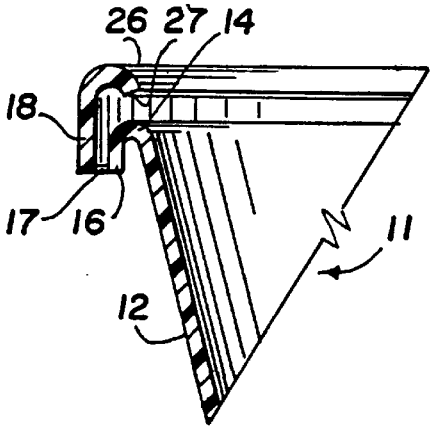
FIG. 4 is a view similar to FIG. 2 showing the curl formed in the upper edge of the band.

Lid 31 may be applied to the container 11 in the condition shown in FIG. 4 by moving the lid 31 vertically downwardly. The bottom edge of skirt 36 engages the curl 26 and bends it outwardly sufficiently so that the lid may pass beyond the curl 26 and seat on the container 11 as shown in FIG. 5. Because of the resilient nature of the bridges 17 and the band 18, the curl 26 returns to the position shown in FIG. 4. As shown in FIG. 5, the curl 26 thus encases the ring 34 of lid 31, holding the same in position. The container is sealed by circles of contact 38 between the upward extending edge 33 and the inside of the wall 12 and by the circle of contact 39 between the underside of the ring 34 and the top of lip 14.

The lid 31 may not be removed so long as the curl 26 engages the ring 34. If one attempts to remove the lid, bridges 17 breaks, giving evidence of tampering. When the consumer wishes to open the container, band 18 is broken away by fracturing bridges 17. By prying upward on the bottom edge of skirt 36, the user may, remove the lid 31. Lid 31 is reclosable since it is merely necessary to force it onto the lip 14 if desired.

Figure 6:
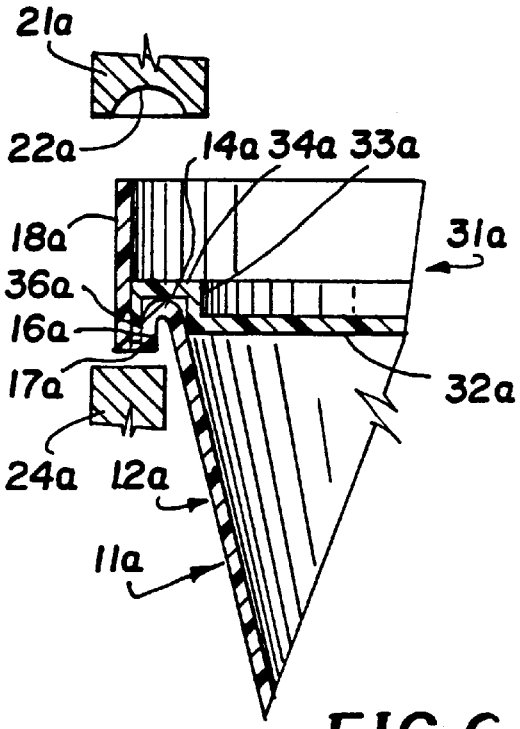
FIG. 6 is a view similar to FIG. 3 showing a modification wherein the lid is applied before curling the tamper-evident band.
Figure 7:
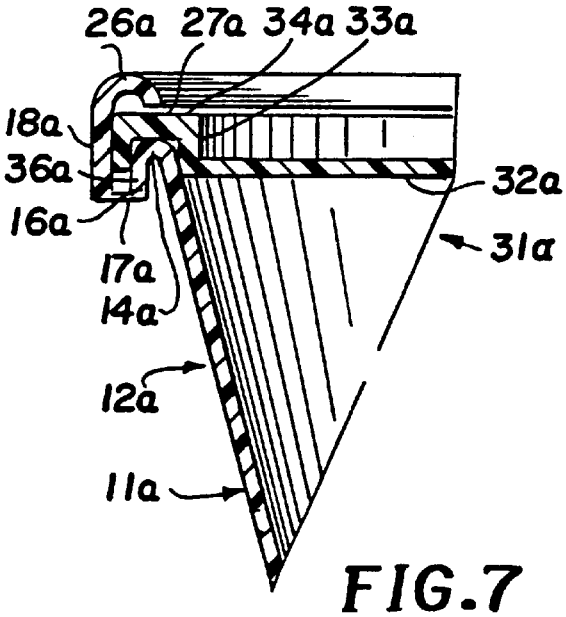
FIG. 7 is a view similar to FIG. 6 showing completion of the curling operation.

In the modification of FIGS. 6 and 7, lid 31a is applied to the container 11a before the band 18a is curled. After application of lid 31a, tools 21a and 24a perform the curling operation.

In other respects the modification of FIGS. 6 and 7 resembles that of the preceding modification and the same reference numerals followed by the subscript a indicated corresponding elements.

In the foregoing description and following claims the terms "circle", "ring" or "cylinder" have been used. It will be understood, however, that the container may be oval, rectangular or other non-circular shapes. The terms will be understood in accordance with this paragraph.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A thin-walled, molded, resilient plastic container having an upper end comprising a wall having an upper lip having an uppermost edge, an initially cylindrical tamper-evident band spaced outwardly *of said wall* and extending above the uppermost edge of said lip formed of a curlable material, *at least a portion of said band being opposed to said wall,* and *a* frangible [means] *connection* joining said band to said wall adjacent said lip *below said uppermost edge*, said band being deformed, the upper portion of said band curling downward-inward in a curled portion, said curled portion having a terminal lowermost edge directly opposed to and spaced above said uppermost edge.

2. A container according to claim 1 in which said lip has a downward-outward curved extension, said frangible [means] *connection* connecting a lower edge of said extension to a lower edge of said bend.

3. In combination, a container according to claim 1 and a lid, said lid comprising a top closing off the upper end of said container and extending outward beyond said lip and interposed between said lip and said lowermost edge of the inward curled portion of said band, a first portion engaging the inside of the upper portion of said wall below said lip and a peripheral depending skirt engaging the outside of said lip disposed inward of said band, whereby said lid cannot be removed without fracturing said frangible [means] *connection* and removing said band.

4. In combination, a thin-walled molded, resilient plastic container having an upper end comprising a wall having an upper lip with a top surface initially cylindrical tamper-evident band spaced outwardly *of said wall* and extending above the top surface of said lip formed of a curlable material, *at least a portion of said band being opposed to said wall,* and a frangible [means] *connection* joining said band to said wall adjacent said lip *below said uppermost edge*, said band being deformed, the upper portion of said band curling downward-inward in a curled portion, said curled portion having a terminus spaced above said lip, [sand comprising] *and* a lid, said lid having a top closing off the upper end of said container, said top having an outer edge and an outward extending portion extending outward beyond said outer edge interposed between said lip and said terminus of the inward curled portion of the band, whereby said lid cannot be removed without fracturing said frangible [means] *connection* and removing said tamper-evident band.

5. The combination of claim 4 in which said lip further comprises seal means sealingly engaging said [lip] *lid*.

6. The combination of claim 5 in which the outer edge of said top engages an interior of said wall of said container and which further comprises an upward extending vertical edge, a ring extending outward from said vertical edge and engaging the top of said lip, and in which said terminus is located immediately above said ring.

7. The combination of claim 6 which further comprises a downward extending skirt on the outer edge of said ring, said skirt engaging an exterior of said lip.

*8. A plastic container comprising a body having an open end and a lip portion surrounding said open end, said lip portion having an outward extending surface and having an uppermost edge,*

*a plastic band formed of a curlable material spaced outward of said body vicinal said open end, at least a portion of said band being opposed to said body,*

*a plurality of circumferentially spaced frangible connections frangibly attaching said band to said lip portion of said body below said outward extending surface,*

*said band having a distal portion deformable to an inward extending orientation directly opposed to and spaced from said outward extending surface, said band being deformed and said distal portion of said band curling downward-inward in a curled portion, said curled portion having a terminal lowermost edge directly opposed to and spaced above said uppermost edge.*

*9. A container according to claim 8 in which said distal portion extends in a downward-inward direction toward said open end when said distal portion is deformed to said inward extending direction.*

*10. A container according to claim 8 in which said lip portion has an annular rim adjacent said open end, said rim comprising said outward extending surface.*

*11. A container according to claim 8 in which said lip portion further comprises a downward directed curved extension, and in which said frangible connections frangibly attach a lower edge of said band to a lower edge of said extension.*

*12. In combination, a thin-walled molded, resilient plastic container and a lid,*

*said container comprising a body having an open upper end comprising a wall having an upper lip portion surrounding said open end having a top surface, said lip portion having an outward extending surface, an initially cylindrical tamper-evident plastic band formed of a curlable material spaced outward of said body vicinal said open end and extending above said top surface of said lip, at least a portion of said band being opposed to said body, a plurality of circumferentially spaced frangible connections frangibly attaching said wall adjacent said lip portion of said body below said outward extending surface, said band being deformed and having a distal end portion deformed to a*

*downward-inward curled portion having a terminus above said tip extending orientation directly opposed to and spaced from said outward extending surface;*

*said lid having a top covering said open end and a peripheral outer portion extending at least partially across said outward extending surface,*

*said outer portion of said lid being positioned between said outward extending surface and said end portion of said band when said end portion is deformed to said inward extending orientation to thereby secure said lid to said container, whereby said band may be removed fro said body by fracturing said frangible connections.*

*13. The combination of claim 12 in which said lid further comprises seal means sealingly engaging said lip portion.*

*14. The combination of claim 12 in which said lid has a downward-extending portion depending from said outer portion and positioned between said band and said lip portion.*

*15. A plastic container comprising a body having an open end and a lip portion surrounding said open end said lip portion having an uppermost edge,*

*a plastic band formed of a curlable material spaced outward of said lip portion and connected to said body below said lip portion with a plurality of circumferential spaced frangible connections, at least a portion of said band being opposed to said body,*

*said band being deformed having a distal end portion deformable and curling downward-inward extending orientation directly opposed to and spaced above said lip portion in a curled portion having a terminal lowermost edge directly opposed to and spaced above said lip,*

*said frangible connections being intermediate said body and said distal end portion, whereby said band may be removed from said body by fracturing said frangible connections.*

*16. A container according to claim 15 in which said distal end portion extends in a downward-inward direction toward said open end when said distal end portion is deformed to said inward extending orientation.*

*17. The container of claim 15 in which said lip portion has an annular rim adjacent said open end, said rim comprising said outward extending body portion.*

*18. In combination, a thin-walled molded, resilient plastic container body and a lid therefore,*

*said container comprising a body having an open end comprising a wall and an upper lip portion having a top surface surrounding said open end, an outward extending body portion, and an initially cylindrical tamper-evident plastic band formed of a curlable material spaced outward of said outward extending and extending above the top surface of said lip of said body portion and connected to said wall of said body below said outward extending body portion and adjacent said lip with a plurality of circumferentially spaced frangible connections, said band having an upper distal end portion deformed and curling downward-inward in a curled portion having a terminus spaced above said lip to an inward extending orientation directly opposed to and spaced above said outward extending body portion,*

*said lid having a top covering said open end and a peripheral horizontally-extending outer portion extending at least partially across said outward extending body portion,*

*said distal end portion of said band overlapping said outer portion of said lid to thereby secure said lid to said container, whereby said band may be removed from said body by fracturing said frangible connections.*

*19. The combination of claim 18 in which said lid further comprises seal means sealingly engaging said lip portion.*

*20. The combination of claim 18 in which said lid has a downward-extending portion depending from said outer portion and positioned between said band and said lip portion.*

* * * * *